(12) United States Patent
Abouelenin (10) Patent No.: US 11,756,029 B2
(45) Date of Patent: Sep. 12, 2023

(54) SECURED END-TO-END COMMUNICATION FOR REMOTE PAYMENT VERIFICATION

(71) Applicant: MASTERCARD INTERNATIONAL INCORPORATED, Purchase, NY (US)

(72) Inventor: Mohamed Abouelenin, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 95 days.

(21) Appl. No.: 16/550,499

(22) Filed: Aug. 26, 2019

(65) Prior Publication Data

US 2020/0065803 A1 Feb. 27, 2020

Related U.S. Application Data

(60) Provisional application No. 62/723,305, filed on Aug. 27, 2018.

(51) Int. Cl.
*G06Q 20/38* (2012.01)
*G06Q 20/36* (2012.01)

(52) U.S. Cl.
CPC ..... *G06Q 20/3829* (2013.01); *G06Q 20/3674* (2013.01); *G06Q 20/388* (2013.01); *G06Q 20/3821* (2013.01)

(58) Field of Classification Search
None
See application file for complete search history.

(56) References Cited

U.S. PATENT DOCUMENTS

| | | | |
|---|---|---|---|
| 7,096,494 B1 * | 8/2006 | Chen | H04L 9/3247 380/278 |
| 9,646,303 B2 | 5/2017 | Karpenko et al. | |
| 11,170,363 B1 * | 11/2021 | Maeng | G06Q 20/3823 |
| 2012/0310760 A1 | 12/2012 | Phillips et al. | |

(Continued)

FOREIGN PATENT DOCUMENTS

| | | | |
|---|---|---|---|
| WO | 2018031856 A1 | 2/2018 | |
| WO | WO-2018031856 A1 * | 2/2018 | G06Q 20/12 |

OTHER PUBLICATIONS

International Search Report and Written Opinion dated Dec. 19, 2019 which was issued in connection with PCT Application No. PCT/US19/048229 which was filed on Aug. 27, 2019.

(Continued)

*Primary Examiner* — Chrystina E Zelaskiewicz
(74) *Attorney, Agent, or Firm* — Buckley, Maschoff & Talwalkar LLC (57) ABSTRACT

Provided are systems and methods for securely providing an encryption key from a remote resource to a secure element. In one example, the method may include receiving transaction data for settling a payment transaction between a merchant and a cardholder of the computing device, reading a merchant encryption key stored in a secure element of the computing device and received from a remote computing service, dynamically generating, via the secure element, a cryptogram that remotely authenticates the transaction data using the merchant encryption key, and transmitting the dynamically generated cryptogram to a computing system associated with the merchant.

19 Claims, 8 Drawing Sheets

(56) References Cited

U.S. PATENT DOCUMENTS

| | | | |
|---|---|---|---|
| 2013/0191290 A1 | 7/2013 | Glendenning et al. | |
| 2014/0012762 A1* | 1/2014 | Glatt | G06Q 20/3563 |
| | | | 705/41 |
| 2015/0019443 A1* | 1/2015 | Sheets | G06Q 20/322 |
| | | | 705/71 |
| 2015/0095219 A1* | 4/2015 | Hurley | G06Q 20/382 |
| | | | 705/39 |
| 2015/0332262 A1* | 11/2015 | Lingappa | G06Q 20/3823 |
| | | | 705/71 |
| 2015/0339664 A1* | 11/2015 | Wong | G06Q 20/4015 |
| | | | 705/71 |
| 2016/0379208 A1* | 12/2016 | Deliwala | G06Q 20/363 |
| | | | 705/67 |
| 2017/0103388 A1* | 4/2017 | Pillai | G06Q 20/3823 |
| 2017/0308895 A1* | 10/2017 | Srivastava | H04L 63/0428 |

OTHER PUBLICATIONS

The Indian First Examination Report dated Nov. 3, 2022 which was issued in connection with a related application, Indian Application No. 202117010075 pp. 6.

* cited by examiner

SECURED END-TO-END COMMUNICATION FOR REMOTE PAYMENT VERIFICATION

CROSS-REFERENCE TO RELATED APPLICATIONS

The present application claims the benefit of priority to U.S. Provisional Patent Application No. 62/723,305, filed on Aug. 27, 2018, in the United States Patent and Trademark Office, the entire disclosure of which is incorporated herein by reference and for all purposes.

BACKGROUND

Online storefronts, online marketplaces, and the like, enable users to conduct transactions on the Internet (referred to as e-commerce). Typically, an online consumer is not physically present with a seller/merchant. Instead, the consumer supplies their payment information (e.g., credit card, address, etc.) into the merchant's website and the merchant makes a promise to ship goods or provide services. Further, the merchant sends the payment information for processing through a backend payment network. In this scenario, both the cardholder and the merchant are subject to risk. For example, e-commerce transactions are highly susceptible to fraud, chargebacks, customer complaints, and the like.

To improve security of electronic transactions, credit card companies, payment processors, banks, and others, are taking additional precautions. For example, tokenization can be used to replace a consumer's personal account number (PAN), and other sensitive details, with non-payment enabled data values (tokens). If a token were to be acquired fraudulently, the token would be useless since it is not actual payment data. As another example, encryption may be used to transform data into a format that is unreadable by anyone without a secret key. But token-based payments and encryption-based payments are still subject to fraud. Outside entities to the payment transaction are usually relied on to generate tokens and/or provide encryption keys. The tokens and/or encryptions keys are then supplied via a public network. As a result, sensitive data remains susceptible to exposure and possible malicious actors.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Digital Secure Remote Payments ("DSRP") is a technology which enables secure transactions for remote payments (e.g., e-commerce, etc.) which can be made by a cardholder using their device. For example, a cardholder may download and install a digital wallet to their device and add payment cards through digitization. The cardholder may select a payment card from the digital wallet when entering into a transaction with the merchant. A DSRP transaction is considered more secure than traditional payments because DSRP transactions contain dynamic data in the form of cryptograms which are generated using Europay, Mastercard and Visa ("EMV")-based cryptography. A cryptogram may include dynamic data of the transaction (e.g., account number (PAN), expiry, CVC, amount, merchant ID, etc.) as well as an indication of a type of cardholder verification performed, an indicator of whether the verification was successful, and the like. Here, cardholder verification may be requested via the cardholder's mobile device and data associated with the verification may be added into the cryptogram to prove this verification has been performed.

In some embodiments, DSRP may also be used in conjunction with tokenization to provide an additional level of transaction security. For example, in place of an account PAN, the DSRP cryptogram may be accompanied by a 16-digit token. The use of a token rather than a PAN minimizes the impact of account data compromise.

Digital wallet providers play a significant role in the DSRP process. For example, a cardholder may select a payment card from the digital wallet stored on their device to execute a DSRP transaction. In this case, a digital wallet provider of the digital wallet may generate the DSRP cryptogram based on transaction data that is received from the cardholder's device (i.e., the mobile wallet installed on the device). The digital wallet provider may generate the cryptogram using cardholder sensitive data (e.g., PAN, expiry, security code, etc.) as well as dynamic transaction data (amount, time, etc.) The cryptogram is then sent back to the digital wallet on the user's device where it can be passed to the merchant to complete the secured transaction.

However, for a digital wallet provider to generate DSRP cryptograms (and participate in DSRP transactions), the wallet provider must either store sensitive cardholder data and/or receive sensitive cardholder data. Access and storage to this sensitive data requires the digital wallet provider to comply with various security standards. For example, payment card industry (PCI) compliance requires entities storing sensitive financial information to satisfy both technical and operational standards to ensure that credit card data is protected. Such compliance can be expensive and time-consuming.

The embodiments herein provide for end-to-end secured communication for DSRP payments without requiring a DSRP cryptogram to be verified by a digital wallet provider, or another remote entity. In one example, a merchant key (or a key of a trusted relay of the merchant) may be stored securely within a secure element of a cardholder device. The merchant key may be provided from a trusted authority (e.g., a hardware security module ("HSM"), etc.) to the secure element through an end-do-end communication process which conceals the merchant key from other parties in the payment network. The trusted authority may transmit the merchant key to the secure element via the digital wallet provider. However, the trusted authority may protect the merchant key with a secret key such that the digital wallet provider cannot read the merchant key. In addition, the secure element may also have a copy of the secret key, enabling the secure element to decrypt the merchant key and use it to generate DSRP cryptograms.

There are different deployment models available for creating the secured end-to-end communication from an outside trusted authority to the secure element on the user device. Various examples of these deployments, including generating a DSRP payload in a secured end-to-end environment, are provide herein. Each process protects the sensitive cardholder data (e.g., the DSRP payload and its contents) from outside entities while still ensuring that the payment is verified by a trusted remote authority.

Figure 1A:
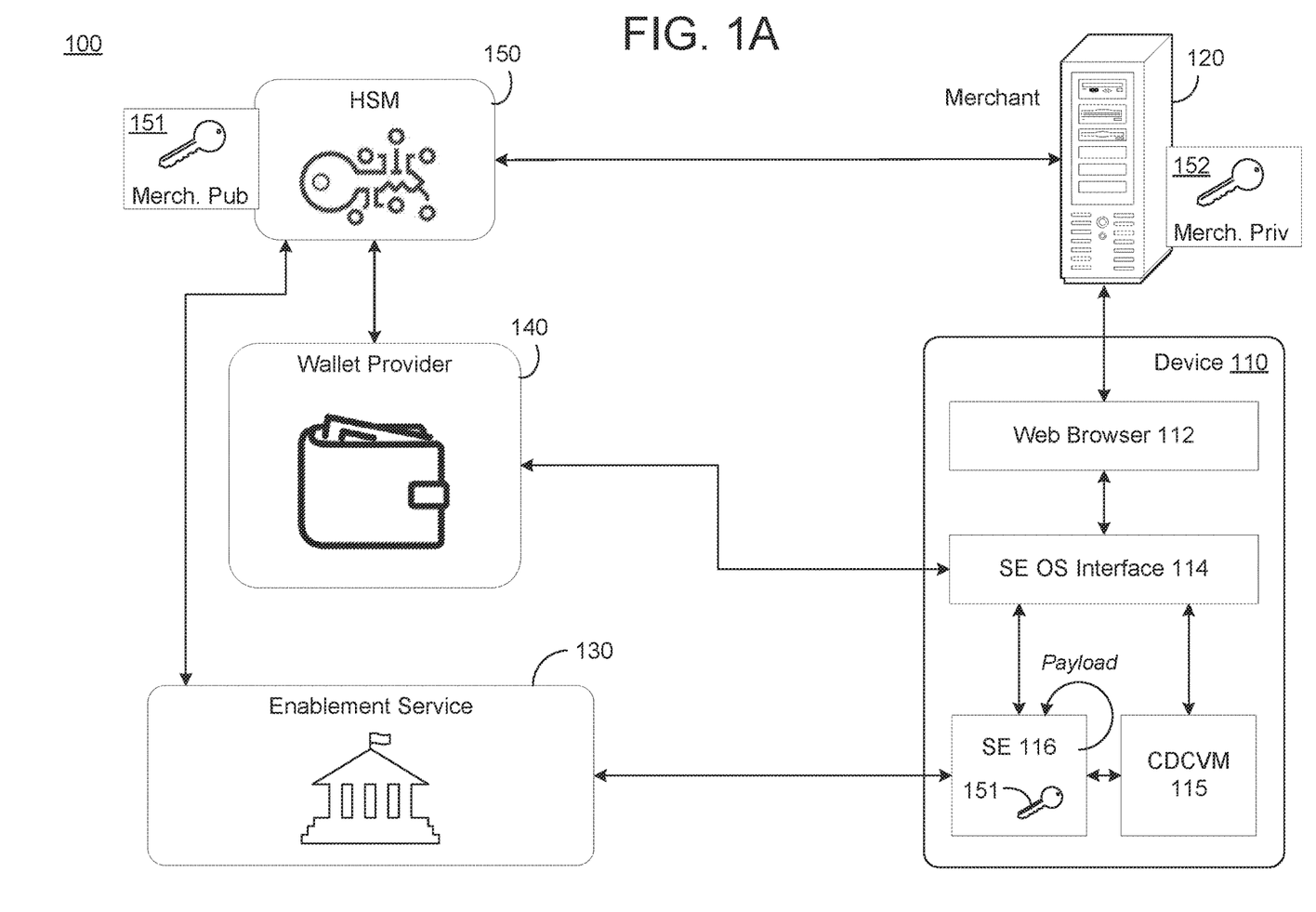
FIG. 1A is a diagram illustrating a payment processing architecture in accordance with an example embodiment.
Figure 1B:
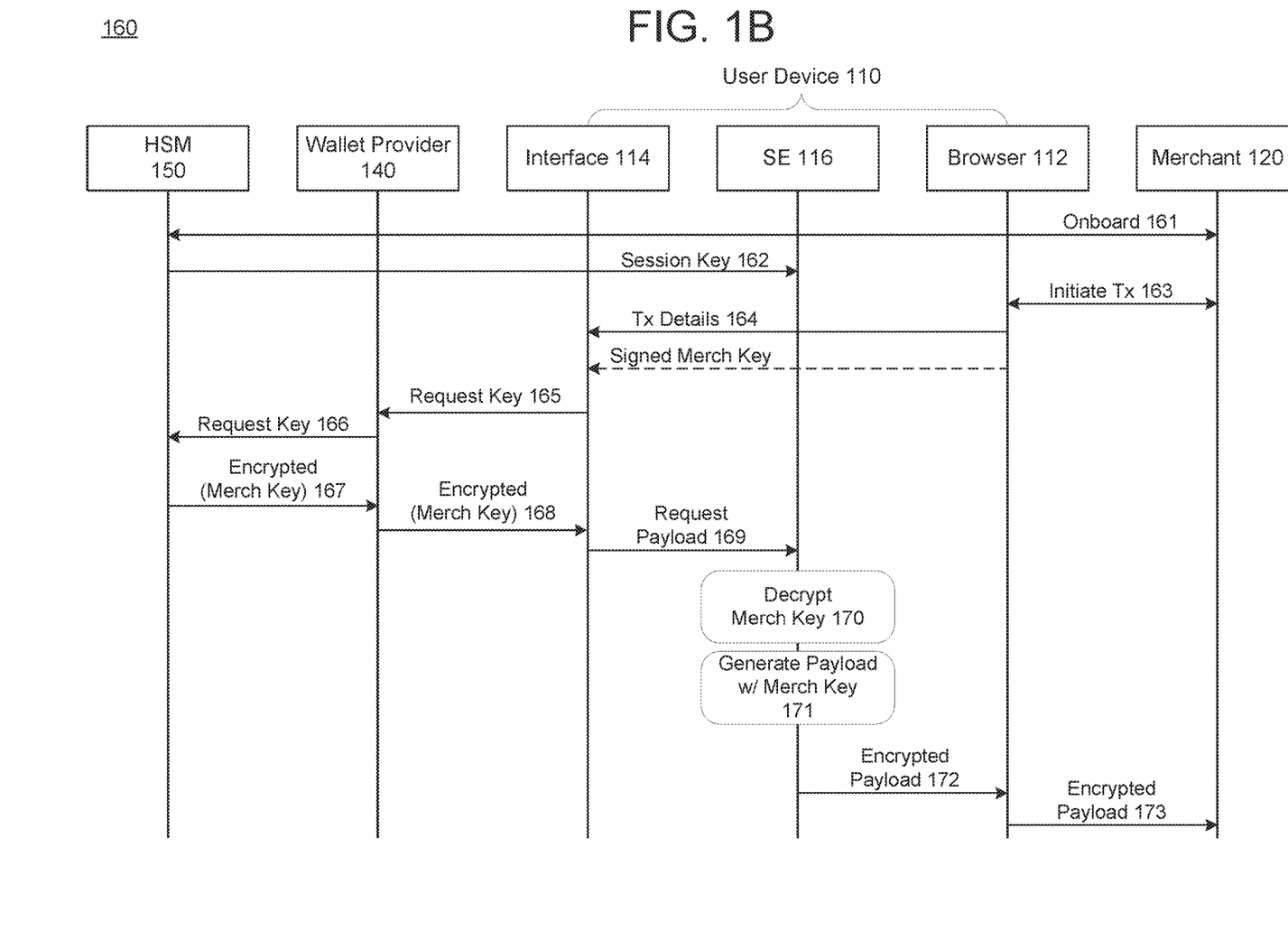
FIG. 1B is a diagram illustrating a process of verifying a payment via a secure element shown in FIG. 1A, in accordance with an example embodiment.

FIG. 1A illustrates a payment processing architecture 100 in accordance with an example embodiment, and FIG. 1B illustrates a process 160 of verifying a payment via a secure element 116 shown in FIG. 1A. Referring to FIG. 1A, the architecture 100 includes a user device 110 that accesses a computing system 120 which is associated with a merchant through a web browser 112 on the user device 110. For example, a cardholder and a merchant may enter into a transaction via the user device 110 interacting with the merchant computing system 120, respectively, via a network such as the Internet, etc. Here, the user may enter into an e-commerce transaction (e.g., payment transaction) with the merchant for goods and services and the payment may be processed based on data exchanged between the user device 110 and the merchant computing 120.

In the example of FIG. 1A, the user device 110 includes the secure element 116, a secure element communication interface 114 ("interface") which provides secure communications to payment network systems and is controlled by the operating system of the user device 110, and a consumer device cardholder verification method ("CDCVM") 115 module which can be used to verify/authenticate that a user of the user device 110 is an authorized user of a payment card being used in the transaction. For example, the CDCVM 115 may perform a passcode verification, biometric verification, facial verification, PIN verification, and the like. The verification information may be provided to the secure element 116 and used by the secure element 116 when generating the payload (payment cryptogram). The secure element 116 may include a processor chip (not shown) and a memory (not shown). The processor chip may execute or otherwise carry out instructions which are held by the memory.

In the examples herein, the secure element 116 may refer to a tamper-resistant hardware chip capable of securely hosting applications (e.g., payment applications, etc.) and confidential and cryptographic data of these applications in accordance with the rules and security requirements set forth by a trusted authority. For example, the secure element 116 may provide a dynamic environment to store data securely, process data securely and perform communication with external entities securely. In some embodiments, the secure element 116 may be an embedded secure element (eSE) which is embedded into the device, such as on a circuit board, and the like.

A payment network may be used to route transaction information to various entities (issuer, acquirer, wallet provider, etc.), and may include various entities including, but not limited to, a digital enablement services 130, a wallet provider 140, and a hardware security module (HSM) 150. A digital wallet hosted by the wallet provider 140 may be installed on the user device 110. The user may add cards to the digital wallet and use these cards when making a purchase with the merchant such as a merchant's checkout page displayed via the web browser 112 of the computing device 110. As further described herein with respect to FIG. 1B, the merchant may associate itself with the trusted authority HSM 150 and receive a private key 152 which is known only the merchant 120. Meanwhile, the HSM 150 may retain a public key 151 of the merchant 120 which corresponds to the private key of the merchant 120 and which can be used to encrypt data that is only capable of decryption via the private key 152. The public key 151 may be securely provided to the secure element 116 on the user device 110 and may be used for signing a payment cryptogram generated by the secure element 116.

Referring to FIG. 1B, in 161, the merchant may onboard itself with a trusted authority such as a hardware security module (HSM) 150. In response, the HSM 150 may generate a key pair (the public key 151 and the private key 152) and return the private key 152 to the merchant 120. Here, the HSM 150 may be the original provider/manufacturer of the secure element 116 but is not limited thereto. In 162, the HSM 150 may provide a session key to the secure element 116. The session key may be provided from the HSM 150 through the digital enablement service 130 shown in FIG. 1A. The session key may be used between the HSM 150 and the secure element 116 to communicate in secret even when passing data via one or more intermediate parties such as the wallet provider 140.

Figure 2:
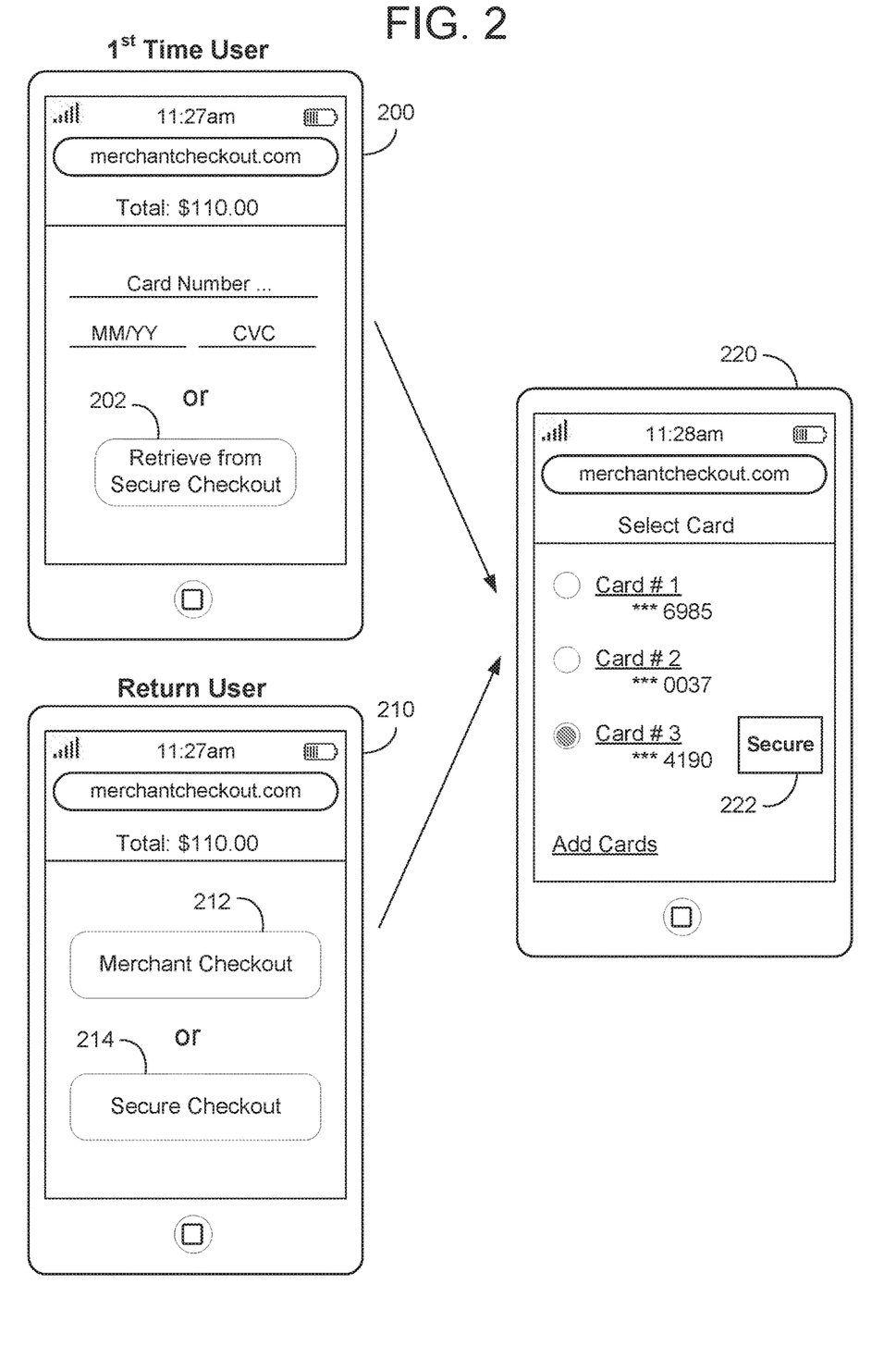
FIG. 2 is a diagram illustrating examples of user interfaces for initiating a payment verification in accordance with an example embodiment.

In 163, the user device 110 initiates a payment transaction with the merchant 120. In this example, the web browser 112 may be used to open a checkout page (e.g., URL, etc.) of website of the merchant 120 to settle a purchase for goods or services. The user may be provided an opportunity choose whether to select a payment card from the digital wallet hosted by wallet provider 140 and use a remote secure payment process (e.g., DSRP, etc.) An example of the user interface is shown in FIG. 2. Here, the user chooses to process the payment via the remote secure payment process with a card stored in the digital wallet hosted by wallet service provider 140. Although not shown in FIG. 1B, the CDCVM 115 may authenticate the user of the user device 110 is an authorized user of the selected payment card via one or more authentication protocols such as biometric, facial, retina, PIN, etc. Further, success or failure of the user authentication may be provided to the secure element 116.

In 164, transaction details (card data, amount, date, time, merchant ID, etc.) may be forwarded to the interface 114. In some embodiments, in addition to the transaction details, the merchant may also provide a signed public key 151 of the merchant 120 to the user device which may be provided along with the transaction details in 163 and 164. In this example, the merchant 120 may provide their signed public key 151 to the interface 114 and then there is no need to request the merchant key from the HSM 150. As another option, the merchant 120 may provide a merchant ID of the merchant 120 instead of the public key 151. In this case, the interface 314 may request the signed merchant key 151 from the HSM 150 using the merchant ID.

If the merchant public key 151 is not provided in 164, in 165, the interface 114 may transmit a request for an encryption key to the wallet provider 140 which includes some of the transaction details and the merchant ID. In some embodiments, the transaction details may be encrypted using a public key of the wallet provider 140 to maintain security. In this example though, rather than generate a payment cryptogram, the wallet provider 140 may forward the request to the HSM 150, in 166.

In 167, the HSM 150 identifies the merchant 120 based on the merchant ID and encrypts the signed merchant public key 151 with the session key previously shared with the secure element 116, in 162. Furthermore, in 167 the HSM 150 transmits the signed merchant public key 151 (protected by the session key) to the wallet provider 140. Because of the encryption, the wallet provider cannot see the signed merchant public key 151. In 168, the wallet provider 140 forwards the signed merchant public key 151 to the interface 114.

In 169, the interface 114 forwards a request for a secure remote payment payload to the secure element 116 which includes the encrypted merchant public key 151. In 170, the secure element 116 may decrypt the encrypted signed merchant public key 151 using the session key shared in 162. In 171, the secure element 116 generates a remote payload (cryptogram) that includes dynamic data for verifying the transaction with the merchant. In addition, the secure element 116 signs/encrypts the payload with the merchant public key 151. The cryptogram may include transaction-based data such as tokenized PAN, expiry, verification code, merchant information, date, time, etc. In addition, the cryptogram may include user verification information provided from the CDCVM 115. Here, a successful user authentication may be identified with a tag or value that is added to the cryptogram. In 172 and 173, the encrypted payload is forwarded to the web browser 112 and then to the merchant 120, respectively. The encrypted payload can then be decrypted by the merchant 120 using the private merchant key 152 known only to the merchant 120. If decrypting is successful, the merchant 120 knows that the public key 151 has been provided by the trusted party (HSM 150).

FIG. 2 illustrates examples of user interfaces for initiating a payment verification in accordance with an example embodiment. Referring to FIG. 2, the merchant website may display a checkout page with an icon or other button or field which allows the user to choose to conduct a secure remote payment. The choice of executing a secure remote payment may be optional and at the discretion of the cardholder, merchant, or the like. Referring to screen 200, the mobile device displays a merchant checkout page via a mobile browser or mobile application which includes a purchase amount as well as fields for filling-in a card number and other card details. In addition, the screen 200 may display a retrieve secure checkout option 202. This option may be given to the merchant during the merchant onboarding with the secure remote payment. If, however, the user is a returning user, the user may receive the screen 210 which includes a merchant checkout option 212 which enables the user to execute a normal e-commerce payment process, and a secure checkout option 214 which enables the user to execute a secure remote payment based on previously stored card data.

In response to the user selecting the retrieve secure checkout option 202 in the screen 200 or the secure checkout option 214 in the screen 210, the browser or mobile application may be directed to a card selection screen 220. Here, the card selection screen may include a list of all cards associated with a digital wallet installed on the device. The cards may include independent identifiers such as secure identifier 222 which indicate whether the card is eligible for secure remote payment. If the user selects the third card (Card #3), the user may enter into a transaction such as shown in step 163 of FIG. 1B.

Figure 3A:
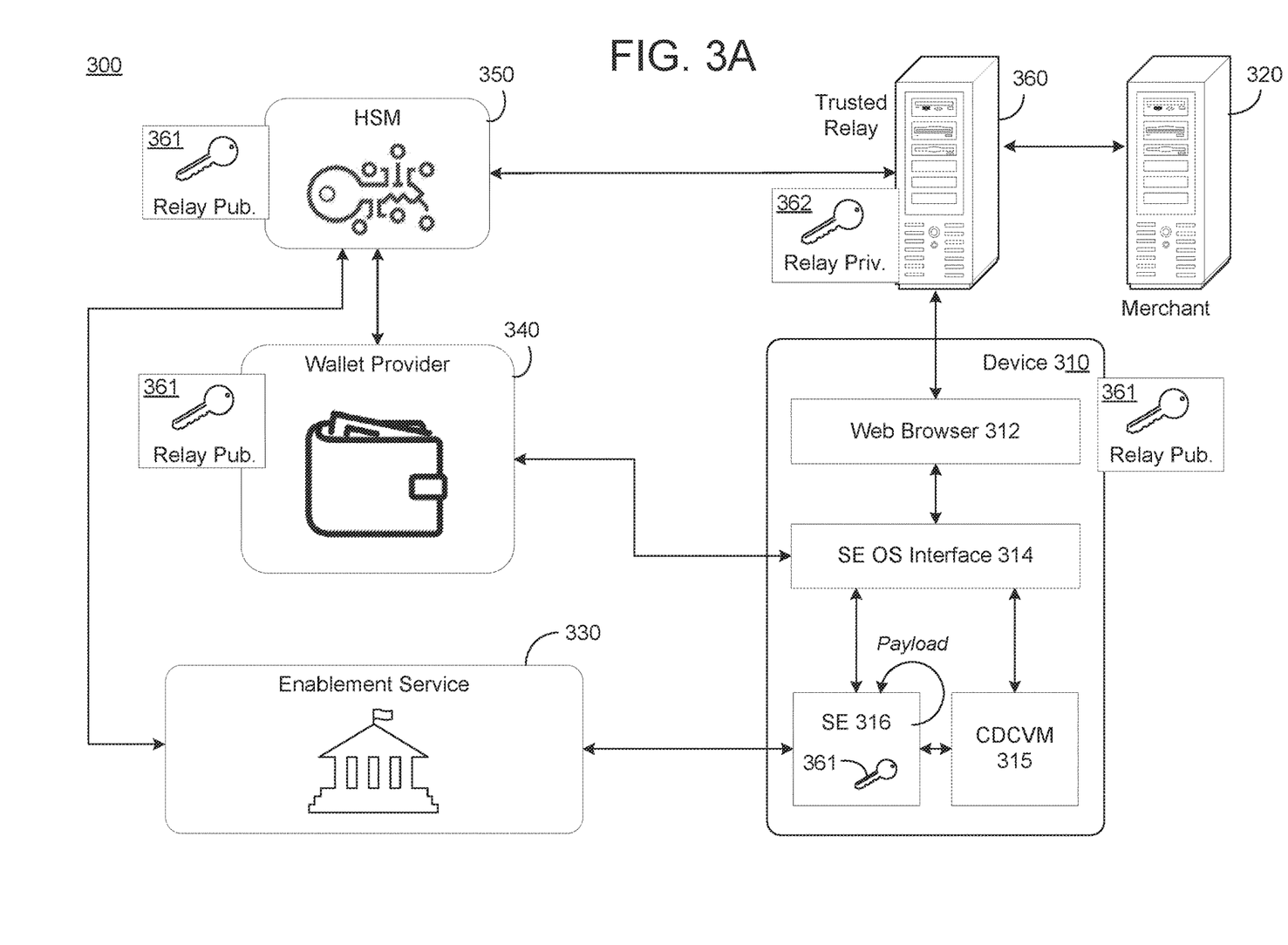
FIG. 3A is a diagram illustrating a payment processing architecture in accordance with another example embodiment.
Figure 3B:
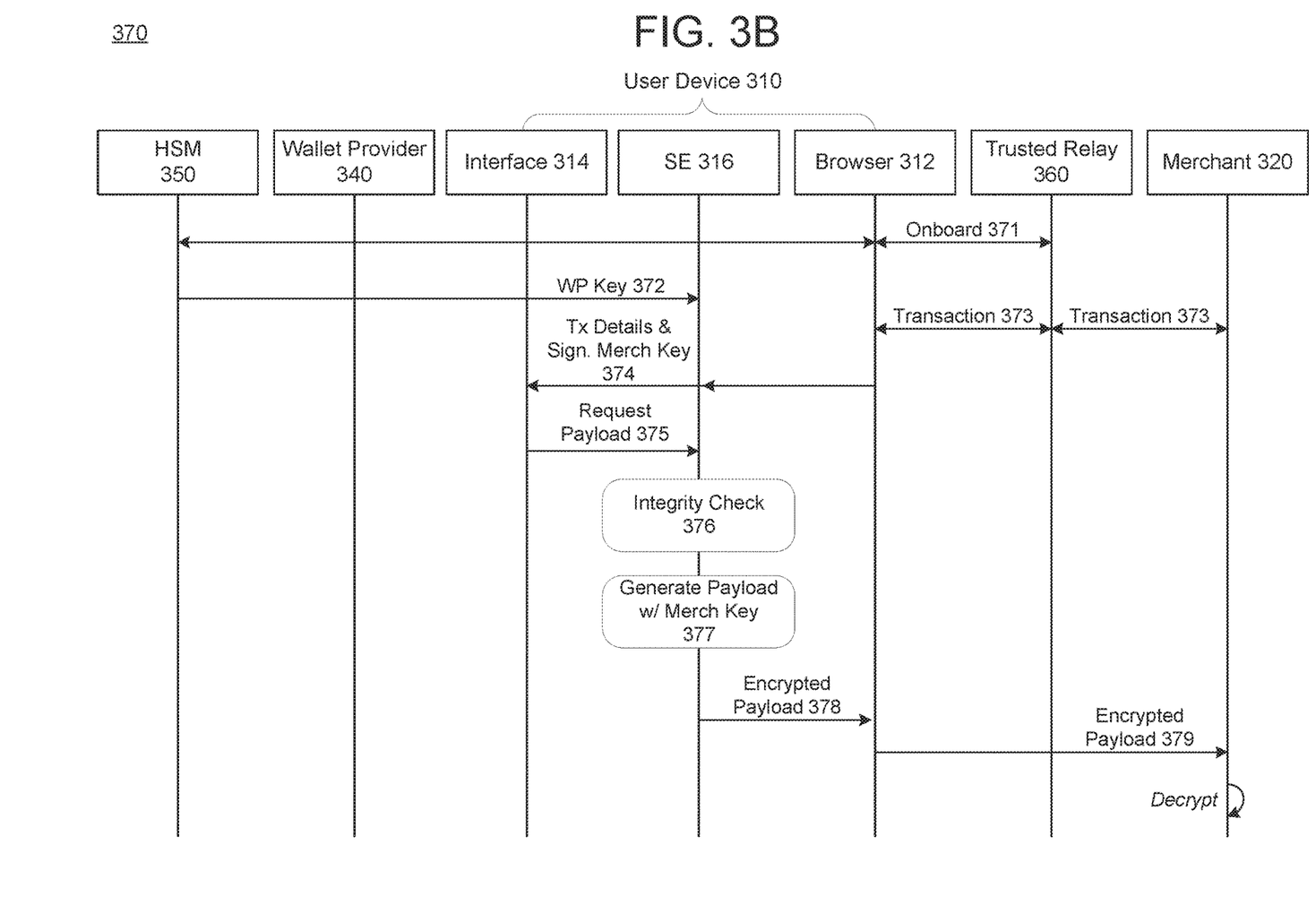
FIG. 3B is a diagram illustrating a process of verifying a payment via a secure element shown in FIG. 3A in accordance with an example embodiment.

FIG. 3A illustrates a payment processing architecture 300 in accordance with another example embodiment, and FIG. 3B illustrates a process 370 of verifying a payment via a secure element 316 shown in FIG. 3A in accordance with an example embodiment. In this example, most of the entities in the architecture 300 are the same as the entities in the architecture 100 shown in FIG. 1A. For example, a user device 310 including a secure element 316, CDCVM 315, interface 314, and web browser 312 may correspond to the user device 110 including the secure element 116, the CDCVM 115, the interface 114, and the web browser 112 of FIG. 1A. Likewise, the merchant 320, the digital enablement service 330, the wallet provider, 340, and the HSM 350 may correspond to the computing device 110, the merchant 120, the digital enablement service 130, the wallet provider 140, and the HSM 150. However, in this example, instead of a merchant 320 onboarding with the HSM 350, the merchant 320 relies on a trusted relay 360. For example, the trusted relay 360 may correspond to a payment processor, an issuing bank, a credit card company, or the like. In this example, the trusted relay 360 provides for secure end-to-end communication of a digital remote payment based on the merchant's key which is provided to the trusted relay 360 from the merchant (creating the level of trust).

Referring to FIG. 3B, in 371, the trusted relay 360 performs an onboarding process with the HSM 350. Here, the HSM 350 generates a public key 361 and private key 362 (which are a key pair) for the trusted relay 360. The HSM 350 may transmit the private key 362 to the trusted relay 360, and distribute the public key 361 to one or more entities such as the user device 310, the wallet provider 340, and the like. As another example, the trusted relay 360 may distribute the public key 361 to one or more entities. In 372, the HSM 350 provides the secure element 316 with a wallet provider key which may be used to verify an integrity of the trusted relay 360. In 373, the user device 310 enters into a transaction with the merchant 320 via the trusted relay 360. For example, a web browser 312 may access a web page, checkout page, etc., of the merchant 320. In 374, the transaction details may be forwarded to the interface 314 and the secure element 316 along with the signed merchant key which has been signed by the trusted relay 360 using its private key 362. Furthermore, although not shown in FIG.

3B, the CDCVM module 315 may authenticate the user of the user device 310 is an authorized user of the selected payment card via one or more authentication protocols such as biometric, facial, retina, PIN, etc. Further, success or failure of the authentication may be provided to the secure element 316.

In 375, the interface 314 may transmit a request to the secure element 316 to validate the integrity of the trusted relay's signature on the merchant key and also to generate a payload. In 376, the secure element 316 may use the wallet key provided from the wallet provider 340 in 372 to verify the signature of the trusted relay 360 added to the merchant key received in 374. Here, the wallet provider key can be used to verify the integrity of the trusted relay key by decoding the signature of the trusted relay 360 on the merchant key received in 374. In addition, by validating the signature of the trusted relay 360, the merchant key may also be validated because its coming from a valid trusted relay 360. In this example, the merchant key is held by the trusted relay 360. Also, the secure element 316 may not know the merchant 320 but knows the trusted relay 360 and may validate the trusted relay's key using a key provided from the wallet provider 340.

In 377, when the integrity check passes, the secure element 316 may generate the transaction cryptogram based on dynamic data to the transaction (dynamic card data, purchase date, merchant data, verification data, etc.) and sign the cryptogram with merchant key. In 378, the secure element 316 may provide the signed payload to the browser 312, which provides it to the merchant 320 in 379. The browser 312 may provide the payload to the merchant 320 which is signed with the merchant public key provided previously in 373. The payload may be used to settle the transaction with the merchant 320.

Figure 4:
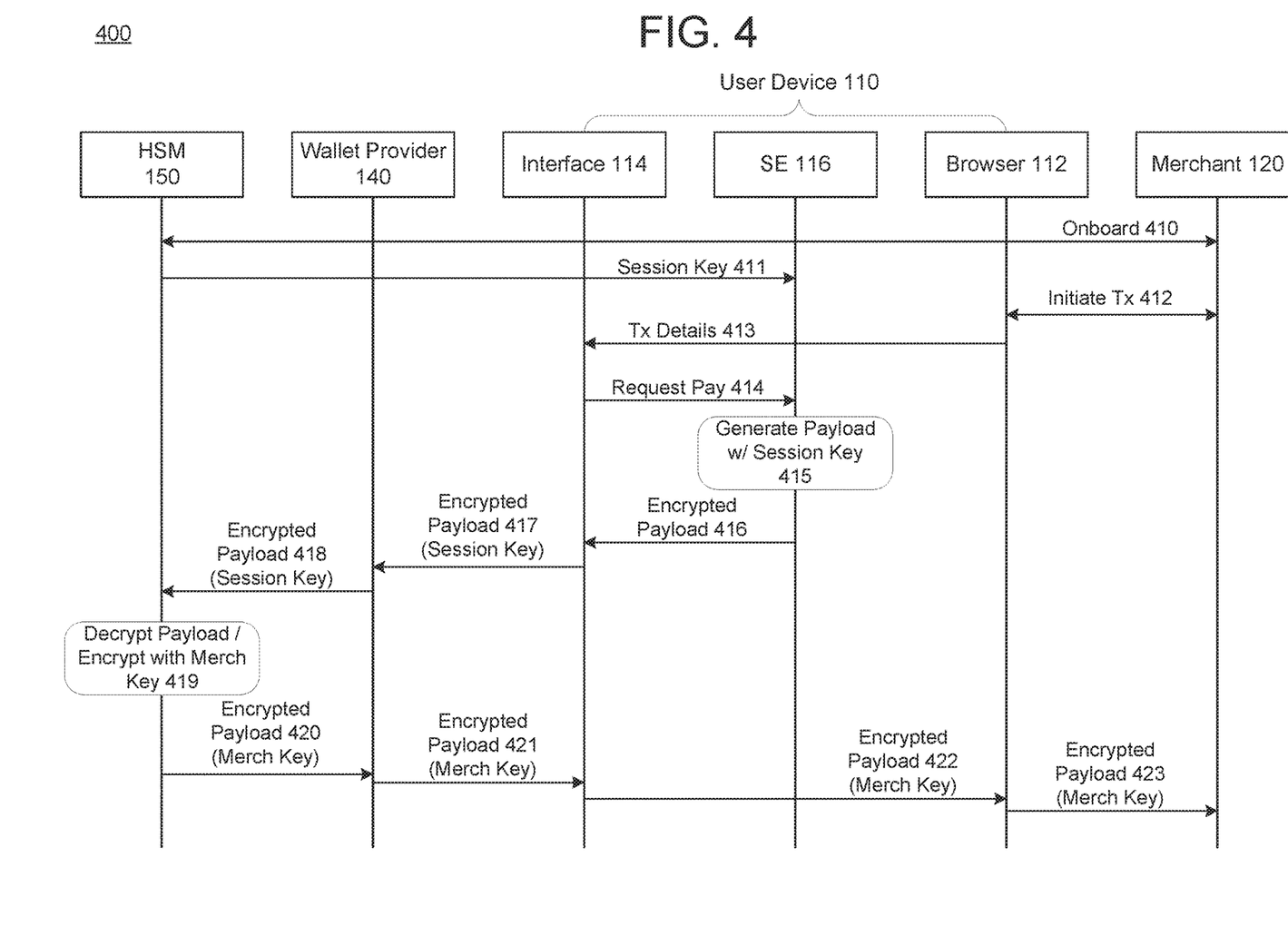
FIG. 4 is a diagram illustrating a process of verifying a payment in accordance with yet another example embodiment.

FIG. 4 illustrates a process 400 of verifying a payment in accordance with yet another example embodiment. The example of FIG. 4 includes the same entities shown in FIG. 1A, however, instead of the merchant key being used by the secure element to encrypt the payload, the merchant key is used by the trusted authority (HSM 150) to encrypt the payload. Referring to FIG. 4A, in 410, the merchant 120 performs an onboarding process with the HSM 150 which results in a private merchant key 152 being stored by the merchant 120 and a public key 151 being stored by the HSM 150, as in the example of FIG. 1A. However, in this example, the merchant public key 151 is not provided to the user device 110.

In 411, a session key is shared with the user device 110 from the HSM 150. Here, the session key may be transmitted from the HSM 150 to the user device 110 via the digital enablement service 130 shown in FIG. 1A. In 412, the web browser 112 of the user device 110 navigates to a merchant checkout page associated with the merchant 120. In response, transaction details are forwarded from the web browser 112 to the interface 114, in 413. Here, in 414, the interface 114 requests the secure element 116 to generate a payload (cryptogram). In this example, in 415, the secure element 116 generates the payload and encrypts it with the session key shared in step 411. In 416-416, the encrypted payload is forwarded to the HSM 150. In 419, the HSM 150 decrypts the payload that has been encrypted with the session key, and encrypts the payload with the public key 151 of the merchant 120. In 420, 421, 422, and 423, the newly encrypted payload is forwarded to the merchant 120. The merchant 120 may decrypt the payload using the private key 152.

Figure 5:
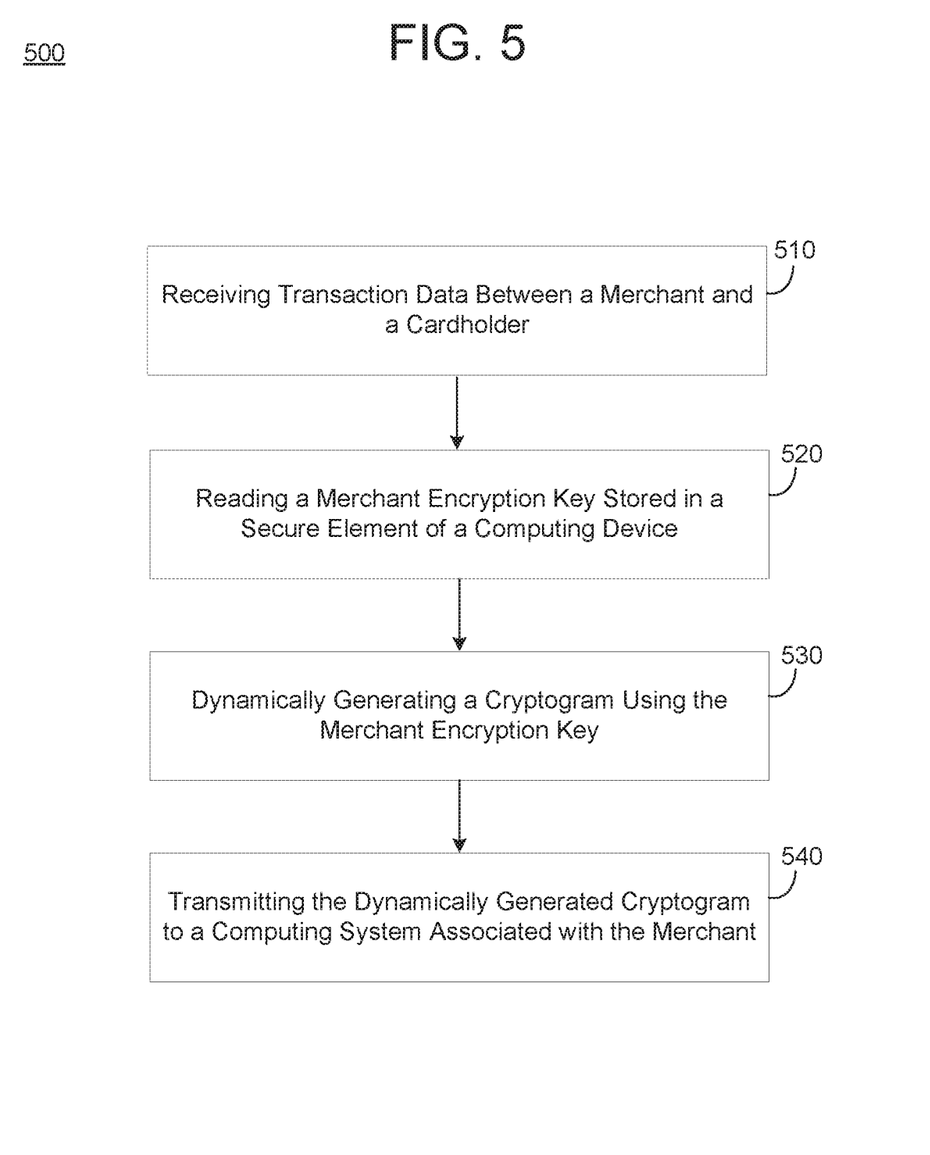
FIG. 5 is a diagram illustrating a method of generating a secure remote payload in accordance with an example embodiment.

FIG. 5 illustrates a method 500 of generating a secure remote payload in accordance with an example embodiment. For example, a processing unit (e.g., one or more processors, processing cores, processor threads, etc.) of computing device (e.g., mobile device, personal computer, server, etc.) may execute software program code to cause a computing device including a secure element, to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format.

In some embodiments, hard-wired circuitry may be used instead of, or in combination with program code to implement the methods and processes. Embodiments are not limited to any specific combination of hardware and software. As an example, the method 500 may be performed by a single device such as a secure element within a mobile device, or a combination of multiple devices such as multiple computers distributed across a network.

Referring to FIG. 5, in 510, the method may include receiving transaction data for settling a payment transaction between a merchant and a cardholder of the computing device. The transaction data may include card data (PAN, expiry, security code, etc.), transaction data (amount, time, date, merchant ID, etc.), and the like. The transaction data may be received by a web browser executing on a computing device and interacting with a merchant website. For example, the transaction data may be received from a window running within a web browser installed on the computing device.

In 520, the method may include reading a merchant encryption key stored in a secure element of the computing device and received from a remote computing service. Here, the merchant encryption key may be dedicated to a merchant in the transaction. The merchant encryption key may be the public key from a key pair including a merchant private key held by the merchant, alone. The merchant encryption key may be received from a remote trusted authority such as a HSM, or other authority. The merchant encryption key may be protected (encrypting) using a session/transport key which is known to the secure element and the trusted authority, but which is not known to any intermediate nodes such as a wallet provider, etc.

In 530, the method may include dynamically generating, via the secure element, a cryptogram that remotely authenticates the transaction data using the merchant encryption key. The cryptogram may be part of a payload and may include encrypted data of the transaction as well as proof of successful authentication of a user of the transaction. The dynamically generating may include encrypting the transaction data to generate a transaction payload, and signing the transaction payload with the merchant encryption key. In 540, the method may include transmitting the dynamically generated cryptogram to a computing system associated with the merchant.

In some embodiments, the method may further include displaying a user interface including a plurality of payment options corresponding to a plurality of payment cards of the cardholder stored in a digital wallet installed on the computing device, and receiving a selection of a payment card from among the plurality of payment cards via the user interface. In some embodiments, the method may further include retrieving the merchant encryption key from a remote key management service via a wallet service provider of a digital wallet installed on the computing device.

In some embodiments, the merchant encryption key may be encrypted with a session key that is unknown to the wallet service provider. In this example, the method may further include transmitting, via a communication interface of the secure element, a request to the remote key management system which includes a merchant identifier, and receiving, via the communication interface of the secure element, a response from the remote key management system which includes the merchant encryption key. In some embodiments, the merchant encryption key may include an encryption key held by a relaying agent of the merchant which is positioned on a network route between the computing device and a merchant computing system.

Figure 6:
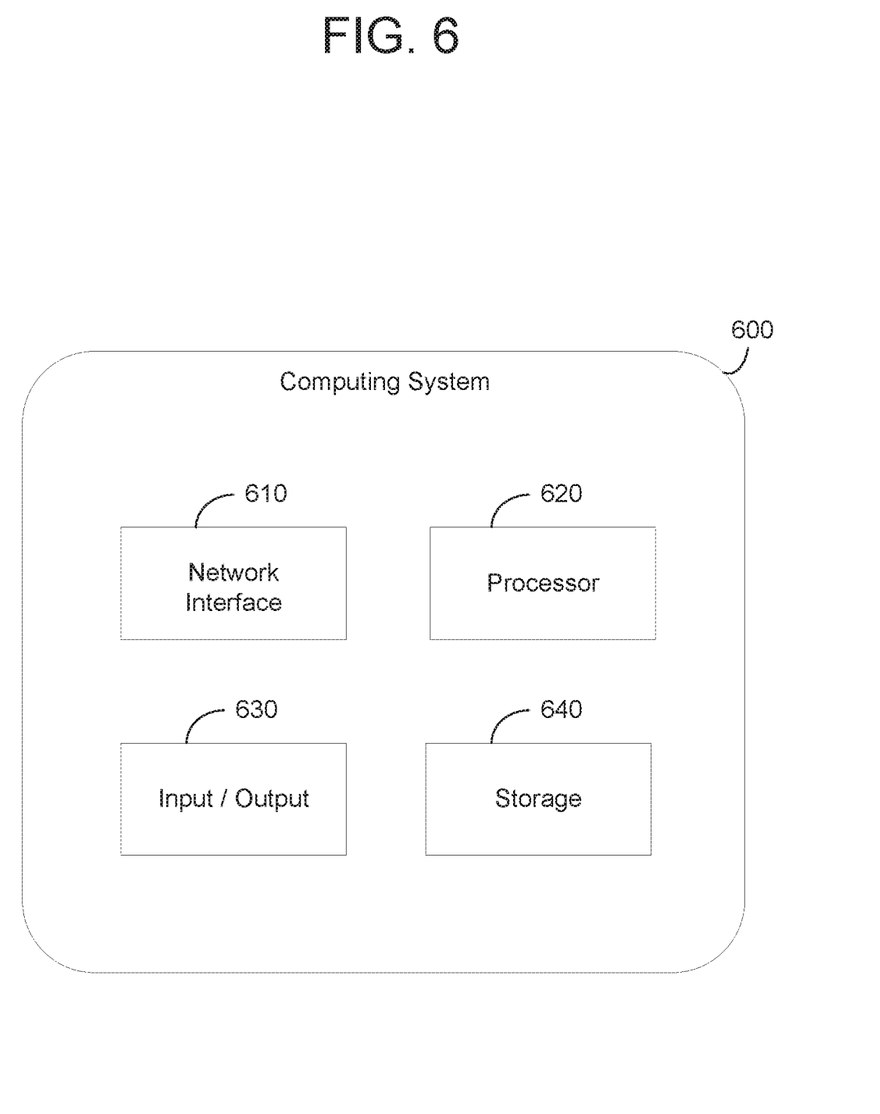
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a mobile device, a server, a cloud platform, a payment network system, a merchant computer, or the like. In some embodiments, the computing system 600 may be distributed across multiple computing devices. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control or replace the other components of the computing system 600.

The network interface 610 may transmit and receive data over a network such as the Internet, a private network, a public network, a payment network, an enterprise network, and the like. The network interface 610 may include a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 6500, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage device 640 may include a secure element, embedded secure element, or the like. Here, the secure element may include a processor (e.g., processor chip, etc.) and a memory storing instructions which can be executed by the processor chip.

According to various embodiments, the network interface 610 may receive transaction data for settling a payment transaction between a merchant and a cardholder of the computing device. The transaction data may be generated by and provided from a merchant website. The processor 620 may a merchant encryption key stored in a secure element of the computing device and received from a remote computing service, and dynamically generate, via the secure element, a cryptogram that remotely authenticates the transaction data using the merchant encryption key. Furthermore, the processor 620 may control the network interface 610 to transmit the dynamically generated cryptogram to a computing system associated with the merchant such as a merchant server, an acquirer system, and the like.

In some embodiments, the processor 620 may display a user interface which includes a plurality of payment options corresponding to a plurality of payment cards of the cardholder stored in a digital wallet installed on the computing device, and receive a selection of a payment card from among the plurality of payment cards via the user interface. In some embodiments, the processor 620 may retrieve the merchant encryption key from a remote key management service via a wallet service provider of a digital wallet installed on the computing device. For example, the remote key management service may be an HSM or other trusted authority. In some cases, the trusted authority may be the designer of the secure element on the computing device, but embodiments are not limited thereto. In this example, the merchant encryption key may be encrypted with a session key that is unknown to the wallet service provider.

In some embodiments, the processor 620 may transmit, via a communication interface of the secure element, a request to the remote key management system which includes a merchant identifier. Furthermore, the processor 620 may receive, via the communication interface of the secure element, a response from the remote key management system which includes the merchant encryption key.

In some embodiments, the processor 620 may encrypt the transaction data, via the secure element, to generate a transaction payload, and sign the transaction payload with the merchant encryption key. In some embodiments, the processor 620 may receive the transaction data, via the secure element, from a window running within a web browser installed on the computing device. In some embodiments, the merchant encryption key may include an encryption key held by a relaying agent of the merchant which is positioned on a network route between the computing device and a merchant computing system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A mobile device, comprising:
   a secure element locally installed on the mobile device and comprising a payment application hosted by a wallet provider;
   a network interface installed on the mobile device that receives a session key shared with a manufacturer of the secure element from a digital enablement service, receive an encrypted merchant public key of a merchant from a remote key management service via the wallet provider that hosts the payment application installed on the secure element, and receive transaction data for settling a payment transaction with the merchant based on a payment card stored in the payment application; and
   a processor that decrypts the encrypted merchant public key with the session key, dynamically generate a cryptogram that remotely authenticates the transaction data and sign the cryptogram via the secure element installed on the mobile device with a signature based on the decrypted merchant public key, wherein the cryptogram is verifiable by a merchant private key that corresponds to the merchant public key,
   wherein the processor controls the network interface and transmits the dynamically generated cryptogram from the secure element on the mobile device to a computing system associated with the merchant.

2. The computing device of claim 1, wherein the processor displays a user interface which includes a plurality of payment options corresponding to a plurality of payment cards of a cardholder stored in the payment application installed on the secure element, and receive a selection of a payment card from among the plurality of payment cards via the user interface.

3. The computing device of claim 1, wherein the session key is hidden from the wallet provider.

4. The computing device of claim 1, wherein the processor:
   transmits an identifier to the remote key management system; and
   receives a response from the remote key management system which includes the encrypted merchant public key corresponding to the identifier.

5. The computing device of claim 1, wherein the processor encrypts the transaction data, via the secure element, and generates a transaction payload, and sign the transaction payload with the decrypted merchant public key.

6. The computing device of claim 1, wherein the processor receives the transaction data, via the secure element, from a web browser installed on the mobile device.

7. The computing device of claim 1, wherein the encrypted merchant public key comprises an encryption key held by a relaying agent of the merchant which is positioned on a network route between the mobile device and the computing system associated with the merchant.

8. A method of a mobile device, the method comprising:
   initiating a payment transaction with a merchant via a payment application hosted by a wallet provider and installed in a secure element of the mobile device;
   receiving, via the secure element, a session key shared with a manufacturer of the secure element from a digital enablement service,
   receiving, via the secure element, an encrypted merchant public key of the merchant from a remote key management service via the wallet provider that hosts the payment application installed on the secure element;
   receiving, via the secure element, transaction data for settling the payment transaction with the merchant based on a payment card stored in the payment application;
   decrypting the encrypted merchant public key with the session key;
   dynamically generating, via the secure element installed on the mobile device, a cryptogram that remotely authenticates the transaction data and signing the cryptogram via the secure element installed on the mobile device with a signature based on the decrypted merchant public key, wherein the cryptogram is verifiable by a merchant private key that corresponds to the merchant public key; and
   transmitting the dynamically generated cryptogram from the secure element on the mobile device to a computing system associated with the merchant.

9. The method of claim 8, further comprising displaying a user interface including a plurality of payment options corresponding to a plurality of payment cards of a cardholder stored in the payment application installed on the secure element, and receiving a selection of a payment card from among the plurality of payment cards via the user interface.

10. The method of claim 8, wherein the session key is hidden from the wallet provider.

11. The method of claim 8, wherein the method further comprises:
    transmitting an identifier to the remote key management system, and
    receiving a response from the remote key management system which includes the merchant public key corresponding to the identifier.

12. The method of claim 8, wherein the dynamically generating comprises encrypting the transaction data to generate a transaction payload, and signing the transaction payload with the decrypted merchant public key.

13. The method of claim 8, wherein the receiving the transaction data comprises receiving the transaction data, via the secure element, from a web browser installed on the mobile device.

14. The method of claim 8, wherein the encrypted merchant public key comprises an encryption key held by a relaying agent of the merchant which is positioned on a network route between the mobile device and the computing system associated with the merchant.

15. A mobile device comprising:
a secure element locally installed on the mobile device and comprising a payment application hosted by a wallet provider, the secure element comprising:
a communication interface that receives an encrypted merchant public key of a merchant from a remote key management service via the wallet provider that hosts the payment application installed on the secure element, wherein the encrypted merchant public key is encrypted with a session key shared with the secure element by a digital enablement service, and
a processor chip that receives transaction data for settling a payment transaction with the merchant based on a payment card stored in the payment application, decrypt the encrypted merchant public key with the session key, dynamically generate a transaction cryptogram that remotely authenticates the received transaction data, and sign the transaction cryptogram via the secure element installed on the mobile device with a signature based on the decrypted merchant public key, wherein the cryptogram is verifiable by a merchant private key that corresponds to the merchant public key; and
a network interface that transmits the transaction cryptogram from the secure element on the mobile device to a merchant system.

16. The computing device of claim 15, wherein the processor chip generates a digital secure remote payment (DSRP) payload based on the received transaction data, and sign the DSRP payload with the decrypted merchant public key.

17. The computing device of claim 15, further comprising a consumer device cardholder verification method (CDCVM) module on the processor chip which authenticates a user of the mobile device, and transmits authentication information of the user to the processor chip of the secure element.

18. The computing device of claim 17, wherein the processor chip of the secure element generates the transaction cryptogram based on the authentication information received from the CDCVM module.

19. The computing device of claim 1, wherein the session key is stored within the secure element via a manufacturer of one or more of the secure element and the mobile device.

\* \* \* \* \*